United States Patent [19]

Feraud et al.

[11] Patent Number: 5,972,849
[45] Date of Patent: Oct. 26, 1999

[54] PROCESS FOR CONTROLLING IRON

[75] Inventors: Jean-Pierre Feraud, Tulsa, Okla.; Hervé Perthuis, Saint Etienne, France; Philippe Dejeux, Saint Priest en Jarez, France; Pierre Maroy, Saint Galmier, France

[73] Assignee: Schlumberger Technology Corporation, Sugar Land, Tex.

[21] Appl. No.: 08/553,964

[22] Filed: Nov. 6, 1995

Related U.S. Application Data

[63] Continuation of application No. 08/211,177, filed as application No. PCT/FR92/00852, Sep. 10, 1992, abandoned.

[30] Foreign Application Priority Data

Sep. 24, 1991 [FR] France ................... 91 11889

[51] Int. Cl.⁶ ............... C09K 7/00; E21B 43/00
[52] U.S. Cl. .................. 507/129; 507/135; 166/279
[58] Field of Search .................. 507/129, 135; 166/279

[56] References Cited

U.S. PATENT DOCUMENTS

| | | | |
|---|---|---|---|
| 2,049,517 | 8/1936 | Saukaitis | 134/3 |
| 2,511,988 | 6/1950 | Myers et al. | 134/3 |
| 2,908,557 | 10/1959 | Black et al. | 134/3 |
| 2,959,555 | 11/1960 | Martin et al. | 134/3 |
| 2,978,366 | 5/1961 | Harwig et al. | 134/3 |
| 3,041,285 | 6/1962 | Newman et al. | 134/3 |
| 3,507,795 | 4/1970 | Gardner | 134/3 |
| 3,579,447 | 5/1971 | Muzyczko et al. | 134/3 |
| 3,585,142 | 6/1971 | Muzyczko et al. | 134/3 |
| 3,686,123 | 8/1972 | Hiroshi et al. | 134/3 |
| 3,730,901 | 5/1973 | Knox et al. | 134/3 |
| 3,803,042 | 4/1974 | Knox et al. | 134/3 |
| 3,907,699 | 9/1975 | Blair | 134/3 |
| 4,180,469 | 12/1979 | Anderson | 134/3 |
| 4,596,849 | 6/1986 | Henson et al. | 507/217 |
| 5,063,997 | 11/1991 | Pachla et al. | 134/3 |
| 5,143,157 | 9/1992 | Harms | 166/300 |

OTHER PUBLICATIONS

CA document 121: 61271.
DL–135–406 (Broers J.) May 02, 1979, see Derwent Abstract 54598B/30 only.
JP–5114396 (Nippon Kogyo Senjo) Sep. 03, 1980, see Derwent Abstract 74209 c/42 only.

*Primary Examiner*—C. H. Kelly
*Attorney, Agent, or Firm*—John E. Vick, Jr.; Douglas Y'Barbo

[57] ABSTRACT

In the presence of certain crude oils, when ferric iron exists in very acidic fluid, it practically instantaneously forms precipitates known as sludges which lead to irreversible damage. Iron control compositions and acid fluids containing such iron control compositions are disclosed. For acid fluids containing up to 15% acid, the iron control composition includes a reducing agent selected from a substituted and unsubstituted thiourea compounds, and a reduction catalyst including a copper (cuprous or cupric) compound. When the acid fluid contains more than 15% acid, for example from 15 to 28% acid, the reducing agent is again selected from substituted or unsubstituted thiourea compounds, and the reduction catalyst is a combination of a copper (cuprous or cupric) compound and iodine (iodine or iodide ions). The invention also includes a process for treatment of oil, water, gas, geothermal or analogous wells using an acid fluid containing an iron control composition according to the present invention, and an industrial cleaning process using a cleaning fluid including an acid fluid containing an iron control agent according to the present invention.

5 Claims, No Drawings

PROCESS FOR CONTROLLING IRON

This application is a file wrapper continuation of U.S. application Ser. No. 08/211,177 filed May 3, 1994 now abandoned, which is a 371 application of PCT/FR92/00852, filed Sep. 10, 1992.

FIELD OF THE INVENTION

The present invention relates to the technical field of acid treatments designed to stimulate the production of oil, gas, water, geothermal and analogous wells, as well as to that of industrial cleaning.

TECHNOLOGY REVIEW

"Industrial cleaning" is to be taken here as meaning the cleaning and, in particular, the elimination by an acid fluid of various deposits and incrustations, of industrial materials and equipment such as pipelines, heat exchanger tubes, boilers, refining towers and analogous items.

The man of the art is very familiar with the aims and techniques of acid treatment, and there is absolutely no need to describe them herein. It should simply be pointed out that the acid fluids pumped into the well and into the adjacent formations are very particular in that their acidity is extremely high.

In the course of acid treatments, there arise certain well known problems linked with the presence of iron in the acid that is pumped into the formations, basically resulting from the fact the rust in the tubings is dissolved by the acid during pumping, and possibly from the dissolving of iron-containing minerals present in the formation.

The presence of iron (III) in the acid injected gives rise, in contact with certain crude oils, to the precipitation of the asphaltic products contained in the oil in the form of deposits having a vitreous aspect, known as "sludges", which leads to practically irreversible damage to the treated zone; the extent of precipitation generally increases with the strength and concentration of the acid.

The dispersibility of the usual additives in the acids, such as surfactants, is also adversely affected by the presence of iron (III) through the formation of complexes. When the acid injected is consumed through the dissolving of the minerals in the formation, the presence of iron (III) leads to the appearance of a colloidal precipitate of ferric hydroxide, damaging the formation.

In the particular case of wells containing hydrogen sulphide, the ferric hydroxide precipitate does not occur, as a reducing medium is involved, but other damaging precipitations such as that of colloidal sulphur, can also occur in the absence of iron control agents.

The use of iron control additives is thus necessary in most acid treatments in order to remove most of the free iron (III) from the treatment acid.

Conventional complexing agents for the soluble forms of iron, such as the derivatives of aminopolycarboxylic acids, citric acid, acetic acid and salicylic acid, only lead to the formation of stable complexes in a medium that is not very acid, and they can be used, therefore, only to mask the iron in the used acid, and they are ineffectual in preventing the formation of sludges induced by contact between certain crude oils and the pumped acid still having a concentration close to the initial concentration.

As a variant, the liquid—liquid extraction of iron (III) in the organic phase, in processes including the injection of suitable solvents, after complexing with certain of these complexing products has also been proposed, but the efficiency of the process is only proven in a used acid medium and is limited to low dissolved iron (III) contents.

The usual iron (III) reducing agents are also generally more efficient in partially used acids than in acids that have not reacted; in a highly acid medium, one often observes reduction kinetics that are too slow to permit thermodynamically possible reactions to enable sludge formation to be prevented efficiently under acid treatment conditions. Furthermore, the chemical and/or thermal stability of the reducing agents considerably restricts their use in a highly acid medium. Sulphur based mineral reducing agents (sulphites, hydrosulphites, etc.), for instance, are unstable in an acid medium.

Organic reducing agents are often limited by the kinetics of their reactions, and by their limited chemical stability in a highly acid medium and with regard to temperature. Thus, the erythorbic acid or the ascorbic acid frequently used in acid treatments can prevent the precipitation of ferric hydroxide in the used acid, but they can sometimes prove seriously inadequate as regards quickly reducing the iron in a highly acid medium, and thus preventing sludge formation.

Similarly, nitrogen and phosphorous based reducing systems have slow reduction kinetics in an acid environment. The use of oxidation reduction catalysts can permit a considerable acceleration of the reduction kinetics; this process is well known, for example, in the field of nickel plating, in which metallic salts are added to hypophosphorous acid baths. The catalyzing electrochemical couple has to have rapid kinetics and a potential that is intermediate between that of Fe (III)/Fe (II) and that of the reducing system selected.

Decisive improvements through the use of a selected catalytic system combined with that of a selection of reducing products for the purpose of reducing the ferric irons in the acid solution practically instantaneously during pumping, thus avoiding the formation of sludges in contact with certain crude oils owing to the presence of iron (III) in the acid, have been made by French patent applications Nos. 91 06774 and 91 09323, which describe the use of certain classes of mercaptans, in combination with catalytic systems composed of $Cu^{++}$ and/or $I^-$.

SUMMARY OF THE INVENTION

According to the present invention, the compounds completely or partially N and/or N' substituted by an alkyl group on the thiourea molecule are selected as reducing agents, for example methyl-, N,N'-dimethyl-, tetramethyl-, ethyl-, N,N'-diethyl- or N,N'-dibutyl-thiourea.

Preference will be given to short chain substituents (i.e. $C_1$–$C_4$ substituted) facilitating the solubility of the reducing agents in an aqueous acid medium. The function S=C< seems to play a decisive part in the efficiency of the reduction, as the homologous urea does not reduce iron (III) under the same conditions.

The above reducing agents are used in combination with specific catalytic systems. The tests conducted on the reducing products used according to the invention have shown that:

a) the choice of the catalyst or of the catalytic system depends on the acidity of the acid fluid pumped; and that:

b) only copper or copper combined with iodine are suitable.

It is noted, quite surprisingly, that the other known catalysts, such as Ni, Mn, Ce, Zn, Co, Sn, V, Cr, Ti, etc. are ineffectual (although not notably affecting the reaction).

Thus, in the case of a 5% acid, the catalyst has to be copper. Iodine alone does not suffice.

This still holds for a 15% acid.

On the other hand, in the case of a 28% acid, copper alone or iodine alone are ineffectual; only the combination of iodine and copper gives adequate kinetics. This copper+ iodine combination is also efficient in the case of less concentrated acids. However, when copper alone is efficient, it is not economical to chose the copper+ iodine combination.

DETAILED DESCRIPTION OF THE INVENTION

According to one of its aspects, the invention thus relates to new compositions for iron control and sludge prevention in the oil industry and associated fields, as well as for applications in industrial cleaning, characterized in that they contain at least one compound of the thiourea type and a catalytic quantity of copper or copper combined with iodine.

In the present application, the term "copper" designates cuprous or cupric ions, and "iodine" designates iodine or iodide ions; as well, of course, as any compound generating in situ the chemical entities defined above.

As the compounds in question are reducers reacting mole for mole with the ferric iron, a minimum concentration corresponding to the stoichiometry is necessary. It is advantageous to increase the reducing agent concentration to accelerate the Fe3+ reduction kinetics. Conversely, in certain cases, there may be cause not to attempt to reduce all of the iron (III).

The compositions according to the invention make it possible to control efficiently (residual iron (III) less than 50 mg/l) at least 30 000 ppm of iron (III) in a 15% hydrochloric acid solution.

A ratio of 1 to 2 in terms of moles for iron (III) and reducing agent is observed to be essential in the case of most reducing agents in order to achieve complete reduction (Table I). However, this ratio can be further decreased to achieve faster reduction. In the case of dimethylthiourea, for example, the reducing agent concentrations will vary typically from 0 to 115 kg/m³ to control from 0 to 30 000 ppm of iron (III) in 15% HCl.

In the case of acids necessitating only a copper salt based catalytic system, the concentrations required for a reduction of iron (III) in less than 2 minutes after mixing will be, for example, from 0 to 4,3 kg/m³ of dihydrate cupric chloride to control from 0 to 30 000 ppm of iron (III) in the acid. In the case of hydrochloric acid with a high concentration (28%), the catalytic system will include, for example, the mixture of 0 to 4.4 kg/m³ of dihydrate cupric chloride and 0 to 2.2 kg/m³ of potassium iodide to control 0 to 15 000 ppm of iron (III) respectively in the acid.

The reducing compounds used according to the invention correspond to the following formula:

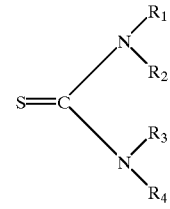

wherein $R_1$, $R_2$, $R_3$ and $R_4$ are chosen independently from hydrogen and the alkyl groups (in practice, preference will be given to hydrogen and the lower alkyl groups).

Absolute preference will be given to the use of dimethyl-1,3-thiourea or tetramethyl-thiourea, which have given the best results.

It will be noted that the technology according to the invention is quite especially useful in the presence of $H^+$ and $Cl^-$ ions (i.e. particularly in the presence of hydrochloric acid in the acid fluid used in the treatment), as this combination of $H^+$ and $Cl^-$ ions is the main cause of the great difficulty experienced in reducing the Fe (3+).

A man of the art will readily contemplate the use of the technical equivalents of the above compounds, such as, for example, longer chains or conventional substitutions not affecting the function of the thiourea group.

The efficiency of the reducing agent/catalyst couples according to the invention was tested with regard to the reduction of Fe $3^+$ to Fe $2^+$ in a highly to extremely acid medium. The following examples, contained in Tables I and II herebelow, illustrate the invention without, however, limiting its scope.

Table I lists the results of tests conducted on numerous thioureas, the criterion being the quantity of Fe (III) reduced in two minutes, for a reducing agent concentration of 3 $10^{-3}$ moles in 10 ml of acid solution.

According to the same criterion, Table II indicates the tests carried out on the thiourea preferred according to the invention, for different catalytic systems.

In Tables I and II, the catalytic system is $CuCl_2$, the quantity being expressed in millimoles.

The values in { } indicate that the catalytic system is a combination of $CuCl_2$ and Kl, the quantities likewise being expressed in millimoles.

TABLE I

| REDUCING AGENT | Temperature | ACID MEDIUM AND QUANTITY OF Fe (III) REDUCED (mmoles) | | | | |
|---|---|---|---|---|---|---|
| (3 mmoles) | (° C.) | HCl 5% | HCl 15% | HCl 29% | HCl 4% - HF 0.5% | HCl 12% - HF 3% |
| THIOUREA | 20 | 0.9 [0.02] | 0.6 [0.1] | 0.5 {0.05–0.02} | 2.1 [0.03] | 0.45 [0.03] |
|  | 90 | 2 [0.01] | 1.1 [0.1] | 0.5 {0.05–0.02} | 2.7 [0.03] | 1.9 [0.03] |
| 1,3-DIMETHYL- | 20 | 2.6 [0.25] | 1.5 [0.25] | 1.8 {0.25–0.125} | 2.3 [0.25] | 2 [0.25] |
| THIOUREA | 90 | 2.8 [0.25] | 0.62 [0.25] | 1 {0.18–0.09} | 2.7 [0.25] | 2.7 [0.25] |
| METHYL- | 20 | 2.4 [0.01] | 2 [0.01] | 1.8 {0.01–0.01} | 2.5 [0.05] | 1.8 [0.05] |
| THIOUREA | 90 | 2.5 [0.01] | 1.6 [0.05] | 0.9 {0.01–0.01} | 2.7 [0.05] | 2.1 [0.05] |
| TETRAMETHYL- | 20 | 2.8 [0.01] | 2.7 [0.01] | 0.7 {0.01–0.01} | 2.8 [0.05] | 2.7 [0.05] |
|  | 90 | 2.95 [0.0] | 2.1 [0.01] | 0.8 {0.01–0.01} | 2.7 [0.05] | 2.1 [0.05] |

TABLE I-continued

| REDUCING AGENT | Temperature | ACID MEDIUM AND QUANTITY OF Fe (III) REDUCED (mmoles) | | | | |
|---|---|---|---|---|---|---|
| (3 mmoles) | (° C.) | HCl 5% | HCl 15% | HCl 29% | HCl 4% - HF 0.5% | HCl 12% - HF 3% |
| 1,3-DIETHYL- | 20 | 0.18 [0.1] | 0.9 [0.1] | | 0.44 [0.05] | 0.2 [0.05] |
|  | 90 | 2.7 [0.1] | 2.4 [0.1] | 2.4 {0.2–0.1} | 1.2 [0.05] | 2.3 [0.01] |
| 1-ETHYL- | 20 | 2 [0.1] | 2.1 [0.1] | | 2.1 [0.01] | 0.2 [0.01] |
| 2-THIOUREA | 90 | 2.7 [0.1] | 2.4 [0.1] | 1 {0.2–0.1} | 1.6 [0.1] | 1.9 [0.01] |
| DIBUTYL- | 20 | | | | | |
| THIOUREA | 90 | | 2.7 [0.02] | | | |

[ ]: QUANTITY OF $CuCl_2$ IN THE REDUCING SOLUTION (mmoles)
{ }: QUANTITY OF $CuCl_2$ + Kl (mmoles)

TABLE II

TESTS WITH DIFFERENT CATALYTIC SYSTEMS IN 15% HCL MEDIUM

| REDUCING AGENT | Temperature | CATALYTIC SYSTEM | |
|---|---|---|---|
| (3 mmoles) | (° C.) | $CuCl_2$ | $CuCl_2$ + Kl |
| THIOUREA | 20 | 0.6 [0.1] | 0.6 {0.05 + 0.05} |
| $H_2N$—$C(S)$—$NH_2$ | 90 | 1.1 [0.1] | 1.2 {0.05 + 0.05} |
| DIMETHYL- | 20 | 1.5 [0.25] | 1.6 {0.05 + 0.05} |
| THIOUREA | 90 | 0.6 [0.25] | 1.1 {0.05 + 0.05} |
| TETRAMETHYL- | 20 | 2.7 [0.01] | 3 {0.05 + 0.05} |
| THIOUREA | 90 | 2.1 [0.01] | 1.8 {0.05 + 0.05} |

[ ]: Quantity of $CuCl_2$ in the reducing solution (mmoles)
{ }: Quantity of $CuCl_2$ + Kl (mmoles)

We claim:

1. A welltreatment process for treating a subterranean formation penetrated by a wellbore extending from a surface to the subterranean formation comprising the steps of:
(a) premixing above the surface of the ground an acid treatment fluid comprising:
 1) up to about 28% of an acid
 2) a reducing agent consisting of a thiourea compound having the formula:

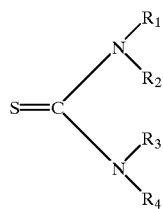

wherein S is sulfur, C is carbon, N is nitrogen and $R_1$, $R_2$, $R_3$, and $R_4$ are independently selected from a group consisting of hydrogen and alkyl groups and
 3) a reduction catalyst consisting of a combination of a copper compound and an iodine compound, and (b) subsequently pumping the acid treatment fluid through the wellbore to the subterranean formation.

2. A process for treating a subterranean formation by preparing a solution above the surface of the ground to reduce formation of iron (III) compounds during the acid treatment of the formation, comprising
(a) premixing a solution above the surface of the ground, the solution comprising
 1) an acidic fluid, the acidic fluid in turn comprising up to about 28% of acid and a reducing agent, said reducing agent selected from the group consisting of compounds corresponding to the formula

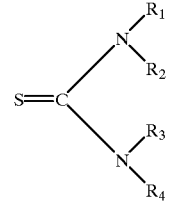

where $R_1$, $R_2$, $R_3$, and $R_4$ are independently selected from the group consisting of hydrogen and alkyl groups, and 2) a reduction catalyst comprising cuprous or cupric ions; and
(b) pumping the premixed solution below the surface of the ground and into the subterranean formation to reduce iron (III) compound concentrations.

3. The process of claim 2, wherein the reduction catalyst comprises a compound selected from a group consisting of tetramethyl-thiourea and 1,3-dimethyl thiourea.

4. The process of claim 2 wherein the quantity of reducing agent is at least equal to the stochiometric quantity necessary for the reduction of the $Fe^{3+}$ dissolved by the acid fluid.

5. The process of claim 2 wherein the acid is hypochloric acid.

* * * * *